United States Patent
Wasserman et al.

(10) Patent No.: US 10,267,152 B2
(45) Date of Patent: Apr. 23, 2019

(54) PILOTED NUT

(71) Applicant: UNITED TECHNOLOGIES CORPORATION, Farmington, CT (US)

(72) Inventors: David J. Wasserman, Hamden, CT (US); Ronald R. Gagnon, Jr., Tolland, CT (US); Christopher M. Juh, South Windsor, CT (US); Larry A. Witherup, Manchester, CT (US); David B. Hudson, Tequesta, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 381 days.

(21) Appl. No.: 14/485,057

(22) Filed: Sep. 12, 2014

(65) Prior Publication Data
US 2015/0078915 A1    Mar. 19, 2015

Related U.S. Application Data

(60) Provisional application No. 61/878,473, filed on Sep. 16, 2013.

(51) Int. Cl.
| | | |
|---|---|---|
| F01D 5/02 | (2006.01) |
| F01D 5/06 | (2006.01) |
| F04D 29/32 | (2006.01) |
| F04D 29/26 | (2006.01) |
| F16B 37/00 | (2006.01) |

(52) U.S. Cl.
CPC .............. *F01D 5/025* (2013.01); *F01D 5/066* (2013.01); *F04D 29/263* (2013.01); *F04D 29/266* (2013.01); *F16B 37/00* (2013.01); *F05B 2260/301* (2013.01); *F05D 2260/31* (2013.01)

(58) Field of Classification Search
CPC ...... F01D 5/025; F01D 5/066; F05D 2260/31; F05B 2260/301; F04D 29/20; F04D 29/263; F04D 29/266; F16B 37/00; Y10T 403/67; Y10T 403/7062; Y10T 403/7064; Y10T 403/7066; Y10T 403/7067; Y10T 403/7069; Y10T 403/7037
USPC ....... 415/216.1; 416/244 R, 244 A; 464/179, 464/183; 411/427
See application file for complete search history.

(56) References Cited

U.S. PATENT DOCUMENTS

| | | | |
|---|---|---|---|
| 3,019,039 A * | 1/1962 | Clavell | F01D 5/025 403/273 |
| 5,022,823 A | 6/1991 | Edelmayer | |
| 5,079,055 A * | 1/1992 | Doyle | B29C 70/24 411/427 |

(Continued)

FOREIGN PATENT DOCUMENTS

| | | | |
|---|---|---|---|
| FR | 2854212 A1 * | 10/2004 | .............. F16B 5/025 |
| WO | WO-2011/087662 A2 * | 7/2011 | |

OTHER PUBLICATIONS

English machine translation of FR 2 854 212 A1, Oct. 29, 2004.*

*Primary Examiner* — Christopher Verdier
(74) *Attorney, Agent, or Firm* — Cantor Colburn LLP

(57) ABSTRACT

The present application relates generally to a piloted nut. The piloted nut may be used on a tie-shaft to apply an axial load to a rotor. A piloting feature on an exterior surface of the nut provides radial piloting to the rotor. The piloted nut may be used in a gas turbine engine to apply an axial load to a rotor.

20 Claims, 4 Drawing Sheets

(56) References Cited

U.S. PATENT DOCUMENTS

| | | | |
|---|---|---|---|
| 6,948,913 B2 * | 9/2005 | Heyes | F01D 5/025 416/204 A |
| 7,470,115 B2 | 12/2008 | Meacham et al. | |
| 8,876,066 B1 * | 11/2014 | Richards | F16B 33/002 248/55 |
| 2013/0004300 A1 * | 1/2013 | Scholz | F01D 5/025 415/170.1 |
| 2013/0034404 A1 * | 2/2013 | Pecho | F16B 37/068 411/378 |
| 2015/0218965 A1 * | 8/2015 | Juh | F01D 25/16 60/792 |

\* cited by examiner

Nut piloting feature 122 may be non-continuous

PILOTED NUT

CROSS-REFERENCE TO RELATED APPLICATIONS

The present application claims the benefit of and incorporates by reference herein the disclosure of U.S. Ser. No. 61/878,473 filed Sep. 16, 2013.

GOVERNMENT LICENSE RIGHTS

This invention was made with government support under Contract No. W911W6-08-2-0001 awarded by the United States Army. The government has certain rights in the invention.

TECHNICAL FIELD OF THE DISCLOSURE

The present disclosure is generally related to rotating assemblies for turbomachinery and, more specifically, to a piloted nut used on a shaft to apply a compressive axial force.

BACKGROUND OF THE DISCLOSURE

Rotating assemblies for turbomachinery are often held together using an axial compressive load applied via a tie-shaft passing through the center of the rotating assembly and a nut threaded onto the end of the tie-shaft. These rotating assemblies must be balanced for use in high speed machinery and the required level of precision can be highly sensitive to the positions of the components.

Gas turbine engines include rotating components such as a fan, a compressor, a shaft, a seal and a turbine. A nut is often used on the end of a threaded shaft to secure and position one or more engine components relative to the shaft. The shaft typically has a radial flange extending outward at one end to provide an abutting surface and threads for the nut at the opposite end. The rotating engine components are stacked along the shaft such that the shaft extends through the center of the components. The nut is threaded to the shaft to apply an axial compressive force through the components that secures them in place relative to the shaft, and thus pilots the components.

Components in a rotating group require an axial facing pilot and a radially oriented pilot when mated to another component. The threads of a nut and bolt (or tie-shaft) provide both an axial facing pilot and a radially oriented pilot at the nut to tie-shaft interface.

The axial facing pilot and radially oriented pilot require geometric control such that these features are true to each other (perpendicular). Lack of perpendicularity of the axial facing pilot and radially oriented pilot results in shaft bow. It is straightforward to control the perpendicularity between the face and the inner or outer diameter surfaces of a component; however, it is difficult to have precision control between the threads of a nut and the face of the nut. This is also true of a bolt, tie-shaft, or other threaded component(s).

For instance, when the nut is threaded onto the shaft and the rotating assembly is placed under axial clamp load, the radial position of the nut can be driven off of the desired centerline position and could be inconsistent from build to build, causing unrepeatable balance results and associated vibration effects. This adversely affects the ability to make consistent, repeatable balance corrections to the rotor assembly. The inclusion of a radial piloting surface on the nut provides a feature to prevent radial movement of the nut and provide consistent positioning of the nut relative to the rotating assembly. This can be accomplished via a piloting surface on an inner diameter or outer diameter surface of the nut. A drawback of placing the piloting feature on an inner diameter surface of the nut is that, under axial load, the nut can expand radially outward thus loosening the piloting fit of the inner surface and negating the benefit of this feature for the balancing process. The outer diameter pilot will increase in size when the nut is loaded, thus maintaining the desired piloting effect and is therefore considered superior to the inner diameter pilot. Various conventional designs for the tie-shaft and nut have been proposed and used in gas turbine engines to maintain position control of the nut relative to the rotor stack, but improvements are still needed in the art.

SUMMARY OF THE DISCLOSURE

In one embodiment, a rotating assembly is disclosed, comprising: a tie-shaft comprising: a tie-shaft shoulder; a tie-shaft outer surface including a tie-shaft threaded portion disposed upon the tie-shaft outer surface; a rotor disposed on the tie-shaft outer surface, the rotor including a rotor interior piloting surface; and a nut comprising: a nut threaded portion disposed on an interior surface of the nut; a nut piloting feature disposed on an exterior surface of the nut and abutting the rotor interior piloting surface; and a radial flange abutting the rotor and extending further in a radial direction than the nut piloting feature; wherein the nut threaded portion is threadingly engaged with the tie-shaft threaded portion such that an axial compressive load is applied to the rotor between the tie-shaft shoulder and the radial flange.

In a further embodiment of the above, the rotor comprises a plurality of rotating members.

In a further embodiment of any of the above, the rotating assembly further comprises a spacer proximate the tie-shaft outer surface, wherein an axial compressive load is applied to the rotor and the spacer between the tie-shaft shoulder and the radial flange.

In a further embodiment of any of the above, the spacer is disposed between the tie-shaft shoulder and the rotor.

In a further embodiment of any of the above, the spacer comprises a hollow cylinder.

In a further embodiment of any of the above, the spacer comprises a toroid with a substantially rectangular cross-section.

In a further embodiment of any of the above, the substantially rectangular cross-section is square.

In a further embodiment of any of the above, the nut piloting feature is continuous around a circumference of the nut.

In a further embodiment of any of the above, the nut piloting feature is non-continuous around a circumference of the nut.

In another embodiment, a nut is disclosed, comprising: a nut threaded portion disposed on an interior surface of the nut; a nut piloting feature disposed on an exterior surface of the nut; and a radial flange extending further in a radial direction than the nut piloting feature.

In a further embodiment of the above, the nut piloting feature is continuous around a circumference of the nut.

In a further embodiment of any of the above, the nut piloting feature is non-continuous around a circumference of the nut.

In another embodiment, a gas turbine engine is disclosed comprising: a tie-shaft comprising: a tie-shaft shoulder; a tie-shaft outer surface including a tie-shaft threaded portion disposed upon the tie-shaft outer surface; a rotor disposed on the tie-shaft outer surface, the rotor including a rotor interior piloting surface; and a nut comprising: a nut threaded portion disposed on an interior surface of the nut; a nut piloting feature disposed on an exterior surface of the nut and abutting the rotor interior piloting surface; and a radial flange abutting the rotor and extending further in a radial direction than the nut piloting feature; wherein the rotor is a compressor section or a turbine section; and wherein the nut threaded portion is threadingly engaged with the tie-shaft threaded portion such that an axial compressive load is applied to the rotor between the tie-shaft shoulder and the radial flange.

In a further embodiment of the above, the gas turbine engine further comprises a spacer proximate the tie-shaft outer surface, wherein an axial compressive load is applied to the rotor and the spacer between the tie-shaft shoulder and the radial flange.

In a further embodiment of any of the above, the spacer is disposed between the tie-shaft shoulder and the rotor.

In a further embodiment of any of the above, the spacer comprises a hollow cylinder.

In a further embodiment of any of the above, the spacer comprises a toroid with a substantially rectangular cross-section.

In a further embodiment of any of the above, the substantially rectangular cross-section is square.

In a further embodiment of any of the above, the nut piloting feature is continuous around a circumference of the nut.

In a further embodiment of any of the above, the nut piloting feature is non-continuous around a circumference of the nut.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
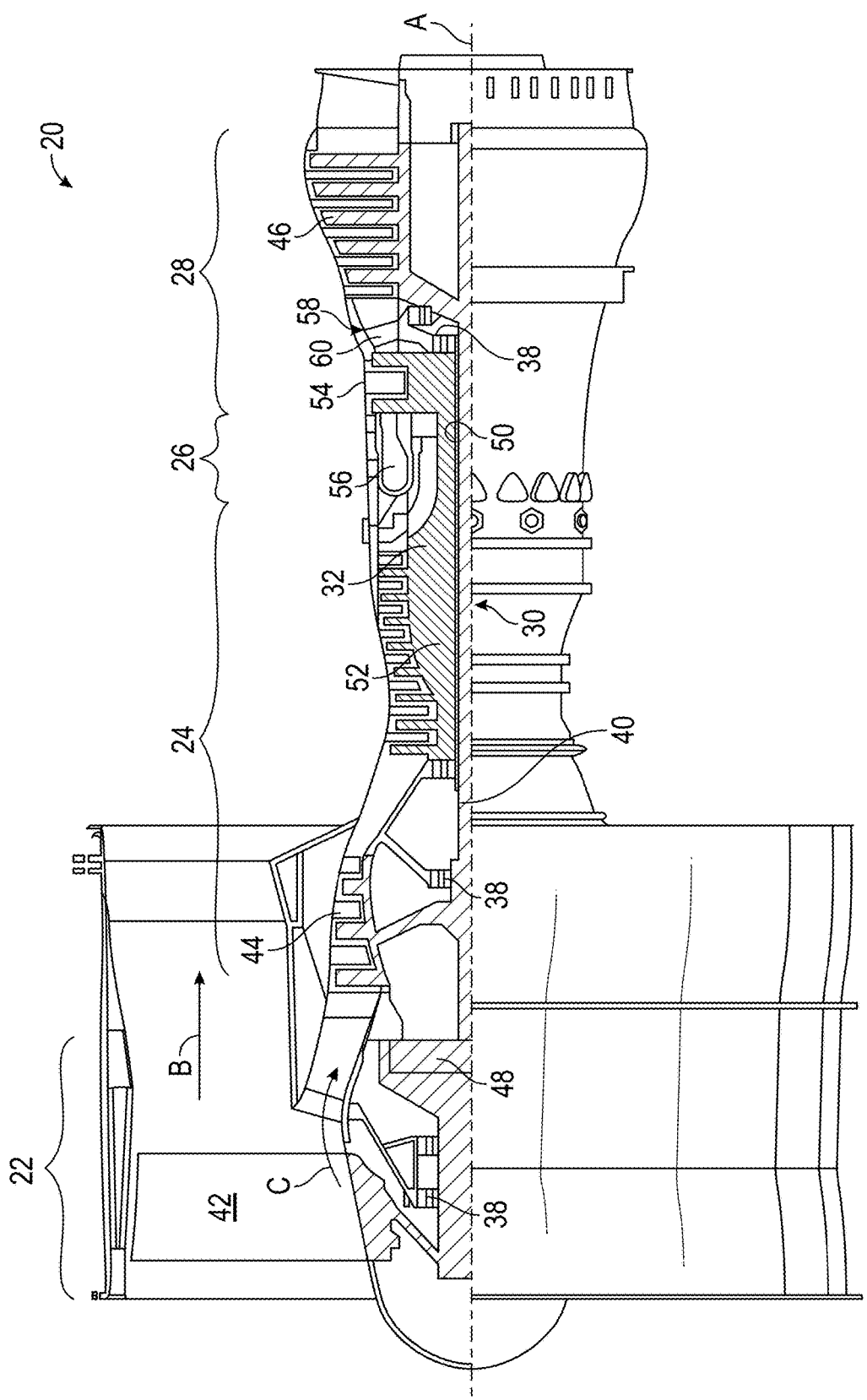
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ °\text{R.})/(518.7°\ \text{R})]^{0.5}$. The "Low corrected fan tip speed" as disclosed herein according to one non-limiting embodiment is less than about 1150 ft/second.

Figure 2:
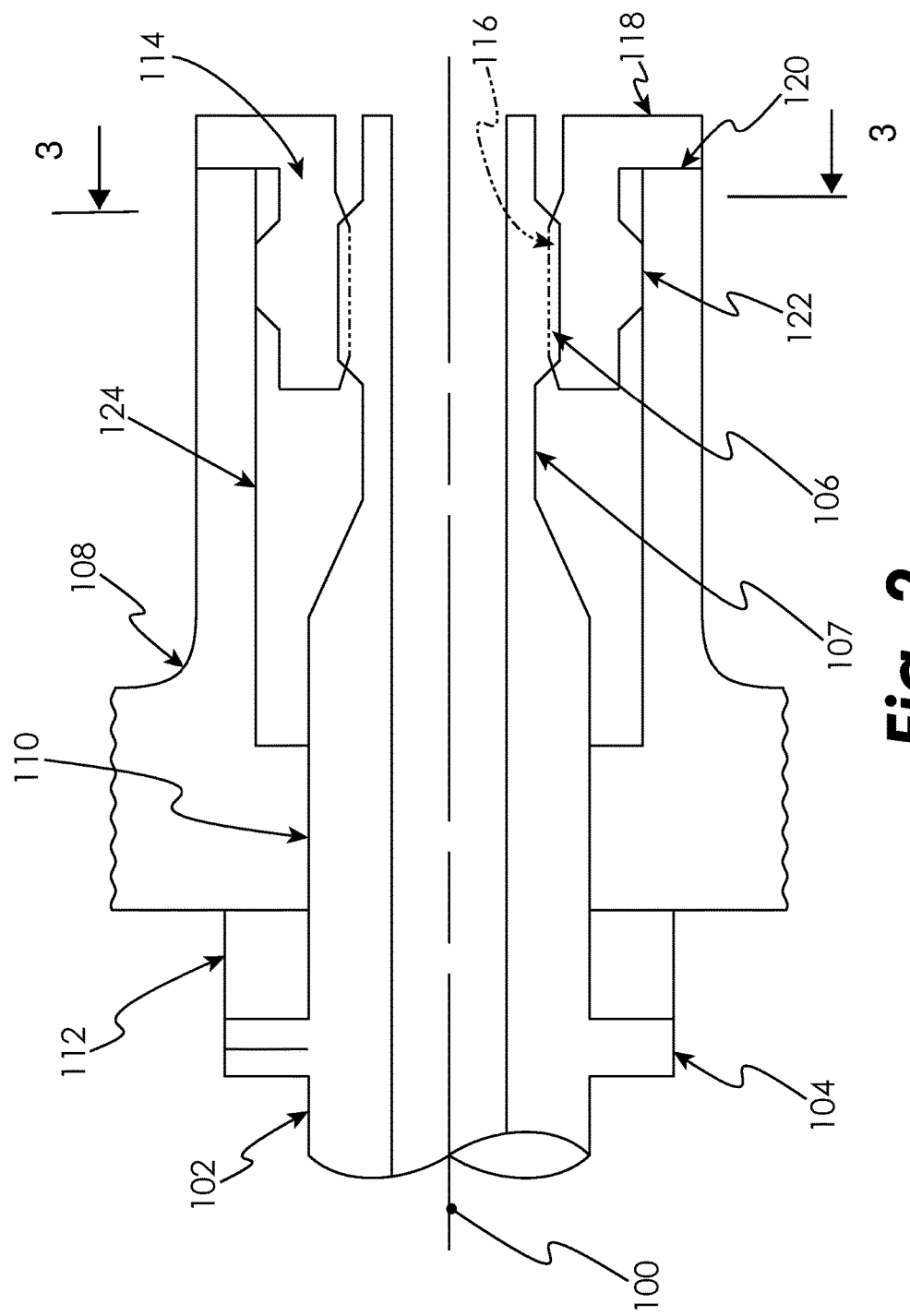
FIG. 2 is a schematic cross-sectional view of a tie-shaft, spacer, rotor and nut in an embodiment.

FIG. 2 schematically illustrates a cross-sectional view of a portion of a turbine engine including rotating components which may rotate about an axial centerline 100 of the turbine engine. It will be appreciated that although turbine components are used to demonstrate the positioning and functioning of the piloted nuts disclosed herein, this is by way of illustration only and the piloted nuts disclosed herein may be used in other applications where it is desired to balance a rotating assembly. For example, the concepts disclosed herein may be useful in rotating automotive and marine systems, electric motors, and steam turbines, to name just a few non-limiting examples.

Figure 2A:
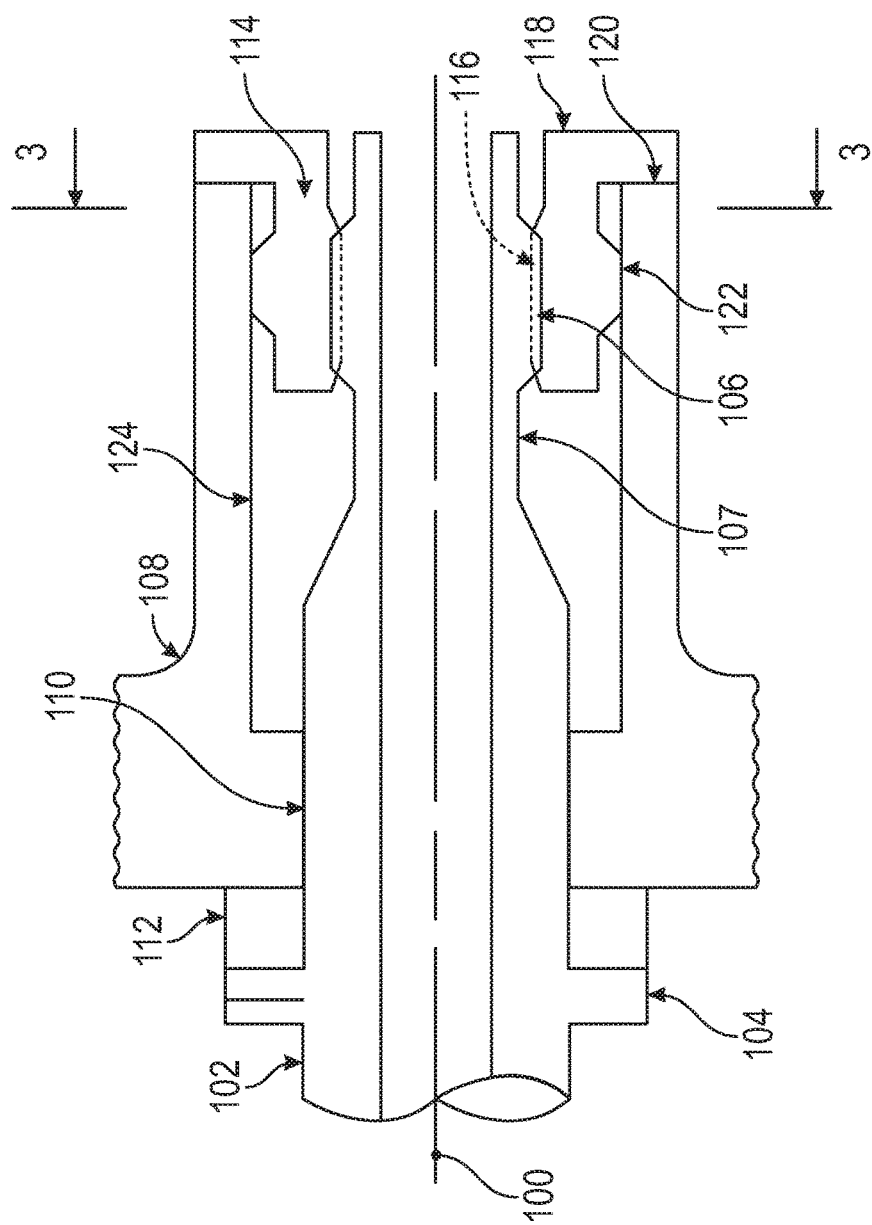
FIG. 2A is a schematic cross-sectional view of a tie-shaft, spacer, rotor and nut in an alternative embodiment.

A tie-shaft 102 is disposed on the engine centerline 100 and includes a tie-shaft shoulder 104 and a tie-shaft threaded portion 106 disposed on a tie-shaft outer surface 107. The tie-shaft threaded surface 106 is disposed on an outside diameter of a portion of the tie-shaft 102. A rotating component (rotor) or a plurality of rotating components (rotor stack) 108 is positioned around and abutting a portion of the tie-shaft outer surface 107. For ease of description, the rotor 108 will be referred to herein in the singular, it being understood that the term "rotor" is also intended to encompass a plurality of rotating components (i.e., a rotor stack). The tie-shaft 102 maintains a radial position of the rotor 108 with respect to the engine centerline 100 by the radial piloting provided by the interface 110 between the tie-shaft outer surface 107 and the rotor 108. A spacer 112 is provided between the tie-shaft shoulder 104 and the rotor 108. In an embodiment, the spacer 112 is substantially shaped as a toroid with a substantially rectangular cross-section. In an embodiment, the rectangular cross-section is square (see FIG. 2A). In an embodiment, the spacer 112 is omitted and the rotor 108 abuts the tie-shaft shoulder 104.

Figure 3:
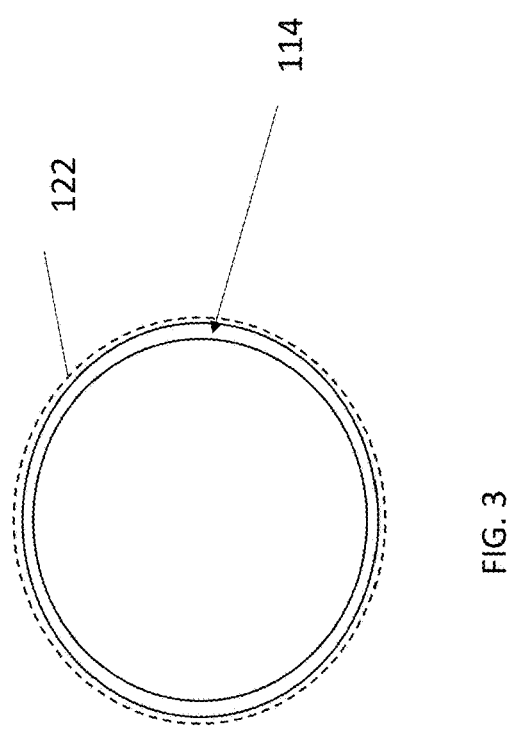
FIG. 3 is a view along lines 3-3 of FIG. 2.
Figure 4:
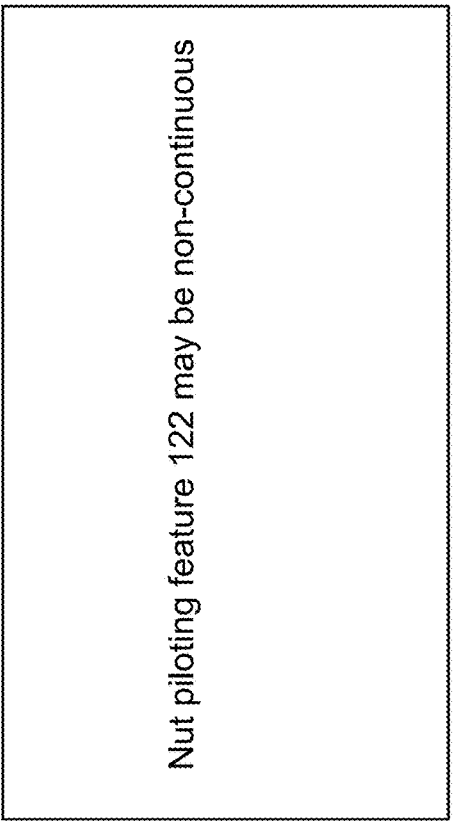
FIG. 4 is an alternative embodiment of the nut illustrated in FIG. 2.

A nut 114 engages the tie-shaft 102 via a nut threaded portion 116 on an interior surface of the nut 114 that engages the tie-shaft threaded portion 106 on the outer surface 107 of the tie-shaft 102. The nut 114 includes a radially-extending flange 118 that abuts a rotor 108 at an axial interface 120. Tightening the nut 114 places the tie-shaft 102 in tension and imparts an axial compressive load on the rotor 108 and the spacer 112 between the tie-shaft shoulder 104 and the radial flange 118. A radial piloting feature, nut piloting feature 122, is also provided on an exterior surface of the nut 114. It will be appreciated that the nut piloting feature 122 may extend continuously around the outer periphery of the nut 114 (See FIG. 3) or may be non-continuous (See FIG. 4.), such that gaps are provided therein to form discrete regions of nut piloting feature 122 around the periphery of the nut 114. The nut radial flange 118 extends further in a radial direction than the nut piloting feature 122. The nut piloting feature 122 pilots against a rotor interior piloting surface 124 on the rotor 108. The rotor 108 is therefore radially piloted to the tie-shaft 102 at the interface 110 between the tie-shaft 102 and the rotor 108 and at the interface between the nut piloting surface 122 and the rotor inner diameter piloting surface 124 on the rotor 108. Furthermore, the axial load is transmitted through the rotor 108 and through the rotor spacer 112 axially retained between the tie-shaft shoulder 104 and the nut 114 radial flange 118. The spacer 112 provides the desired axial positioning of the rotor 108 on the tie-shaft 102.

Unlike other solutions having an inner diameter piloting surface on the tie-shaft retention nut, nut piloting feature 122 does not loosen with radial expansion of the nut 114 under axial loading. The radial position of the nut 114 is thus maintained with respect to the rotor 108 and the tie-shaft 102, resulting in reduced shaft bowing and more repeatable balance results. The spacer 112 axially disposed between the tie-shaft shoulder 104 and the rotor 108 provides adjustability of the axial position of the rotor 108 upon the tie-shaft 102.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A rotating assembly for a gas turbine engine, comprising:
   a tie-shaft comprising:
      a tie-shaft shoulder extending radially outward from the tie-shaft;
      a tie-shaft outer surface including a tie-shaft threaded portion disposed upon the tie-shaft outer surface;
   a rotor disposed on an interface of the tie-shaft outer surface, the interface extending radially outward from the tie shaft outer surface such that the tie-shaft outer surface has a smaller dimension than a dimension of the interface of the tie-shaft outer surface, and the rotor including a rotor interior piloting surface; and
   a nut comprising:
      a nut threaded portion disposed on an interior surface of the nut;
      a nut piloting feature disposed on an exterior surface of the nut, the exterior surface of the nut being opposite to the interior surface of the nut, the nut piloting feature extending radially outward from the exterior surface of the nut and contacting the rotor interior piloting surface when the nut is secured to the tie-shaft and the rotor is disposed on the interface of the tie-shaft outer surface; and a radial flange extending radially outward from the nut, the radial flange extending further in a radial direction outward from the nut than the piloting feature of the nut;

wherein when the nut threaded portion threadingly engages the tie-shaft threaded portion when the rotor is disposed on the interface of the tie-shaft outer surface, portions of the rotor are located between the tie-shaft shoulder and the radial flange such that an axial compressive load is applied to the rotor, and wherein a radial position of the rotor is provided by the interface between the tie-shaft outer surface and the rotor.

2. The rotating assembly of claim 1, wherein the rotor comprises a plurality of rotating members.

3. The rotating assembly of claim 1, further comprising:
a spacer proximate the tie-shaft outer surface and located between the tie-shaft shoulder and the radial flange;
wherein the axial compressive load is applied to the rotor and the spacer when the rotor is disposed on the interface of the tie-shaft outer surface and the portions of the rotor are located between the tie-shaft shoulder and the radial flange.

4. The rotating assembly of claim 3, wherein the spacer is located between the tie-shaft shoulder and the rotor.

5. The rotating assembly of claim 3, wherein the spacer is a hollow cylinder.

6. The rotating assembly of claim 5, wherein the spacer is a toroid with a substantially rectangular cross-section.

7. The rotating assembly of claim 6, wherein the substantially rectangular cross-section is square.

8. The rotating assembly of claim 1, wherein the nut piloting feature is continuous around a circumference of the nut.

9. The rotating assembly of claim 1, wherein the nut piloting feature is non-continuous around a circumference of the nut.

10. The rotating assembly of claim 1, wherein the radial flange is located at a distal end of the nut.

11. A gas turbine engine comprising:
a tie-shaft comprising:
a tie-shaft shoulder extending radially outward from the tie-shaft;
a tie-shaft outer surface including a tie-shaft threaded portion disposed upon the tie-shaft outer surface;
a rotor disposed on an interface of the tie-shaft outer surface, the interface extending radially outward from the tie shaft outer surface such that the tie-shaft outer surface has a smaller dimension than a dimension of the interface of the tie-shaft outer surface, and the rotor including a rotor interior piloting surface; and
a nut comprising;
a nut threaded portion disposed on an interior surface of the nut;
a nut piloting feature disposed on an exterior surface of the nut, the exterior surface of the nut being opposite to the interior surface of the nut, the nut piloting feature extending radially outward from the exterior surface of the nut and contacting the rotor interior piloting surface when the nut is secured to the tie-shaft and the rotor is disposed on the interface of the tie-shaft outer surface; and a radial flange extending radially outward from the nut, the radial flange extending further in a radial direction outward from the nut than the nut piloting feature of the nut;

wherein the rotor is a compressor section or a turbine section; and wherein when the nut threaded portion threadingly engages the tie-shaft threaded portion when the rotor is disposed on the interface of the tie-shaft outer surface, portions of the rotor are located between the tie-shaft shoulder and the radial flange such that an axial compressive load is applied to the rotor, and wherein a radial position of the rotor is provided by the interface between the tie-shaft outer surface and the rotor.

12. The gas turbine engine of claim 11, further comprising:
a spacer proximate the tie-shaft outer surface and located between the tie-shaft shoulder and the radial flange;
wherein the axial compressive load is applied to the rotor and the spacer when the rotor is disposed on the interface of the tie-shaft outer surface and the portions of the rotor are located between the tie-shaft shoulder and the radial flange.

13. The gas turbine engine of claim 12, wherein the spacer is located between the tie-shaft shoulder and the rotor.

14. The gas turbine engine of claim 12, wherein the spacer is a hollow cylinder.

15. The gas turbine engine of claim 14, wherein the spacer is a toroid with a substantially rectangular cross-section.

16. The gas turbine engine of claim 15, wherein the substantially rectangular cross-section is square.

17. The gas turbine engine of claim 11, wherein the nut piloting feature is continuous around a circumference of the nut.

18. The gas turbine engine of claim 11, wherein the nut piloting feature is non-continuous around a circumference of the nut.

19. The gas turbine engine of claim 11, wherein the radial flange is located at a distal end of the nut.

20. A rotating assembly for a gas turbine engine, comprising:
a tie-shaft comprising:
a tie-shaft shoulder extending radially outward from the tie-shaft;
a tie-shaft outer surface including a tie-shaft threaded portion disposed upon the tie-shaft outer surface;
a rotor disposed on an interface of the tie-shaft outer surface, the interface extending radially outward from the tie shaft outer surface such that the tie-shaft outer surface has a smaller dimension than a dimension of the interface of the tie-shaft outer surface, and the rotor including a rotor interior piloting surface; and
a nut comprising:
a nut threaded portion disposed on an interior surface of the nut;
a nut piloting feature disposed on an exterior surface of the nut, the exterior surface of the nut being opposite to the interior surface of the nut, the nut piloting feature extending radially outward from the exterior surface of the nut and contacting the rotor interior piloting surface when the nut is secured to the tie-shaft and the rotor is disposed on the interface of the tie-shaft outer surface; and
a radial flange extending radially outward from the nut, the radial flange extending further in a radial direction outward from the nut than the piloting feature of the nut;

wherein when the nut threaded portion threadingly engages the tie-shaft threaded portion when the rotor is disposed on the interface of the tie-shaft outer surface, portions of the rotor are located between the tie-shaft shoulder and the radial flange such that an axial compressive load is applied to the rotor, and wherein the radial flange is located at a distal end of the nut.

* * * * *